3,475,282
ENHANCED STRIPPING OF FUGACIOUS
MATERIALS FROM AQUEOUS DISPERSIONS
Charles E. Hamilton, Midland, Mich., assignor to The
Dow Chemical Company, Midland, Mich., a corporation of Delaware
No Drawing. Filed Feb. 8, 1968, Ser. No. 703,859
Int. Cl. B01d 3/34, 1/14
U.S. Cl. 203—49                                       10 Claims

ABSTRACT OF THE DISCLOSURE

Fugacious organic materials are stripped from aqueous dispersions, i.e., suspension or solution, by simultaneously contacting the dispersion with non-wetting solid surfaces and a gas stream. The stripping rate for the fugacious materials, especially in dilute aqueous systems, is significantly enhanced by the presence of the non-wetting surfaces.

---

It is well known that fugacious materials can be separated from aqueous dispersions by blowing the dispersion with a gas stream. The gas stream entrains the vapors of water and the disperse, fugacious organic material as a function of their respective vapor pressures at the temperature of the system and their relative concentrations. Because water is the predominant component removed from dispersions in which the fugacious organic material is a relatively minor constituent, removal efficiencies are often too low for practical application of the process.

It would be desirable, and it is a principal object of the instant invention, to provide an improved method for separating fugacious organic materials from aqueous dispersion. In particular, it is an object to provide an improved process for stripping fugacious organics, which may be dissolved or suspended in water, with a stream of gas. Especially, it is an object to provide an improved method for air stripping of dilute aqueous dispersions of vaporizable organics.

In accordance with the instant invention, aqueous dispersions containing dissolved or suspended fugacious organic materials are blown with a gas stream in the presence of solid materials having non-wetting surfaces. Materials with suitable non-wetting surfaces may be slurried in the liquid to be stripped or the materials may be contained in a bed over which the liquid to be stripped is flowed and simultaneously contacted with the gas stream. The latter may be constituted of any gas inert and essentially insoluble in aqueous systems, such as nitrogen, helium, methane and oxygen but, as a matter of convenience, will usually be air.

For reasons not fully understood, the non-wetting surfaces function to enhance the rate of mass transfer of the fugacious material from solution or dispersion into the vapor state relative to vapor generated from the aqueous suspending medium. Thus, within the gas stream, there is removed a relatively greater proportion of the fugacious organic material than would be separated without the presence of the non-wetting surfaces.

Suitable solid materials are characterized by having a surface which is essentially hydrophobic, i.e. the surface is not wet by water. Such materials will be characterized by freedom from any substantial proportion of hydrophilic constituents, which would tend to render the solid surface water-wetting. Whether a particular solid surface is sufficiently non-wetting for the purposes of the invention is readily ascertained simply by placing a drop of water on a flat surface of the material in question and ascertaining from the angle of contact whether the water droplet has adhered to, or wet, the solid surface. If the droplet remains essentially intact, i.e., it does not significantly adhere, the surface is sufficiently non-wetting for the purposes of the instant invention. Suitable non-wetting materials include polyethylene, polypropylene, polystyrene, polyvinyl toluene, polybutadiene, polyisoprene and halogenated derivatives of the foregoing including, for example, polyvinyl chloride and polyvinylidene chloride. Also useful are the various hydrophobic organo silicones such as ethyl silane, dimethyl silane, polytrimethyl silane, polymethylphenyl siloxane and polydimethyl siloxane. In general, hydrocarbon polymers consisting mostly of carbon and hydrogen and the hydrophobic silicones consisting of carbon, hydrogen, oxygen and silicon are preferred as non-wetting materials.

Since it is only the surface of the solid material which functions to aid the improved mass transfer, useful solid materials with non-wetting surfaces can be prepared by applying liquid non-wetting materials to a particulate substrate. For instance, one of the silicone polymers or hydrocarbon polymers may be coated on particulate forms of clay, coal, sand, pumice and the various ceramic shapes used in column packings to provide solid shapes with the necessary non-wetting surfaces.

For best results, when using the slurry contacting technique, the non-wetting solid materials should have a density within the range from about 0.95 up to about 1.05. Although neither limit is critical to operability, solid particles within this density range will form a suspension within the aqueous system to be treated with relatively mild agitation. Otherwise, auxiliary agitation requirements will become substantial in order to maintain the non-wetting surfaces uniformly suspended throughout the system to be stripped.

The amount of non-wetting materials used in the slurry technique is not critical. Some benefit will be achieved with very small amounts of the non-wetting solids slurried throughout the aqueous dispersion to be stripped. Often the non-wetting solids can be usefully employed in amounts from about 0.1 up to about 35 percent by weight of the system to be stripped. The rate of mass transfer will be increased with increases in the amount of non-wetting solids so long as efficient agitation and simultaneous contacting of the gas, liquid and solids can be maintained.

Example 3

When fixed beds of non-wetting solids are used in the practice of the invention, the bed is preferably equipped for counter-current liquid-gas flow. The solid packing for the bed should comprise solid materials which leave a void space sufficient to allow for efficient simultaneous contacting of gases and liquids. Well known for this purpose are various physical shapes such as spheres, rings and saddles. Conventional bed packings of these shapes are adapted for use in the invention by coating their surfaces with a material which is non-wetting. The liquid to be stripped is fed to one end of the column and air blown in at the other. At normal flow rates, such columns will operate most efficiently in a vertical alignment.

Regardless of which contacting technique is employed, i.e. the slurry or fixed bed technique, either continuous or batch operation may be employed. The fixed bed, of course, is well adapted for continuous operation since there is no requirement for solids separation. In the continuous slurry treatment, a stream of an aqueous dispersion to be stripped is flowed through a contact zone in which the non-wetting particles are uniformly contacted with the flowing stream. The particles can be separated from the liquid stream by any solids-liquid separation technique, such as filtration or settling. The separated non-wetting particles can then be recharged to the contact zone. Other modes of continuous operation will readily occur to those skilled in the art inasmuch as the technologies of efficient gas-liquid contacting and solids-liquid separations are well established.

The unique mass transfer effects achieved in accordance with the instant invention will become more evident upon consideration of the following specific embodiments of the invention.

Example—Series I

An aqueous solution containing approximately 68.5 parts per million of dissolved methanol was charged to an enclosed reaction vessel equipped with a stirrer, gas sparger and a gas vent. Particulate polyethylene having a particle size classification from 30 to 80 mesh was added to this dispersion at a dosage of 1 part by weight per thousand parts by weight of the dispersion. The resulting slurry was stirred and sparged with 200 cc. per minute of nitrogen. The initial as well as subsequent concentrations of the disperse organic phase were measured by combustion analysis of the solution for total carbon.

A second aliquot of the methanol dispersion employed above was treated in a similar manner, except that the polyethylene particles were omitted from the dispersion.

A third aliquot was treated with the polyethylene particles and stirred, but no gas was sparged through the dispersion. The analyses of each aliquot of the methanol dispersion, after elapsed times of 4, 8, 16 and 48 hours, are set forth in the following table. Also set forth are data from a similar series of tests employing an aqueous dispersion containing 1544 parts per million of dissolved methanol.

TABLE I

| | Aliquot Organics Remaining (p.p.m.) | Second Aliquot Organics Remaining (p.p.m.) | Third Aliquot Organics Remaining (p.p.m.) |
|---|---|---|---|
| SERIES 1 | | | |
| Elapsed Time (hrs.): | | | |
| 0 | 68.5 | 68.5 | 68.5 |
| 4 | 41.0 | 67.0 | 58.5 |
| 8 | 32.0 | 64.5 | 58.5 |
| 16 | 17.1 | 57.5 | 58.5 |
| 48 | 2.0 | 37.7 | 58.4 |
| SERIES 2 | | | |
| Elapsed Time (hrs.): | | | |
| 0 | 1,554 | 1,554 | 1,554 |
| 4 | 1,393 | 1,520 | 1,548 |
| 16 | 387 | 1,305 | 1,548 |
| 48 | 45 | 855 | 1,548 |

From the above data on the first and second aliquots, it is readily apparent that the stripping of the methanol from aqueous solution in the presence of the particulate polyethylene proceeded at a substantially enhanced rate as compared to stripping with air alone. The test series on the third aliquot of methanol solution shows the polyethylene adsorbed a small amount of methanol on its surface but this remained constant with the passage of time.

Recognizing that the above enhanced stripping rates were achieved through the use of approximately one gram of polyethylene per 1000 grams of solution treated, it is readily apparent that these rates can be significantly increased with larger amounts of particulate non-wetting polyethylene. Substantial removals are possible with contact times as low as about 5 minutes when using larger amounts of particles. In a continuous process, higher concentrations of the particulate polyethylene will be desirable in order to reduce residence time in the contact zone, thus minimizing equipment size requirements.

Example 2

To illustrate the application of the invention to removing a suspended fugacious organic phase from aqueous dispersion, such a dispersion containing 100 milligrams per liter of benzene was charged to a container equipped with an air sparger. Incorporated into the dispersion was 1 gram per liter of polyethylene having a particle size passing an 80 mesh screen. Air was blown through the suspension at a constant rate of about 200 cubic centimeters per minute. After 15 minutes of air sparging, no benzene remained in dispersion by analysis of the aqueous dispersion for its carbon content.

In a similar manner, a second aliquot of the dispersion containing 100 milligrams per liter of benzene was air blown without the presence of the polyethylene. The time required to reduce the benzene content to a comparable limit was from 30 to 45 minutes, an increase by a factor of about 2.

Example 3

In further operations in accordance with the invention, propylene oxide was stripped from water solution in the presence of polyethylene particles.

One liter aliquots of an aqueous propylene oxide dispersion containing about 50 milligrams per liter of the oxide, were contacted with an air stream at the rate of 200 cc. per minute in the presence of 1 gram per liter of polyethylene. This non-wetting material had a particle size in the range from 30 to 80 mesh. The dispersion was analyzed every 15 minutes up to one hour, and again at two hours to follow the rate of separation. For the purposes of comparison, a similar series was run on an aliquot of the propylene oxide solution aerated without the presence of polyethylene particles. The results are set forth in the following Table II.

TABLE II.—RUNNING ANALYSES FOR PROPYLENE OXIDE

With non-wetting solids:

| Time (min.): | P.p.m. |
|---|---|
| 0 | 50 |
| 15 | 13 |
| 30 | 6.2 |
| 45 | 11.6 |
| 60 | <1.6 |
| 120 | <1.6 |

Without non-wetting solids:

| Time (min.): | |
|---|---|
| 0 | 50 |
| 15 | 45 |
| 65 | 30 |
| 120 | 19.1 |

The above data indicates a significantly enhanced removal rate in the presence of polyethylene particles.

Example 4

That superior separation rates can be achieved in fixed beds of non-wetting surfaces is illustrated by the following: An aqueous dispersion containing a few parts per million of benzene per liter was contacted with a countercurrent stream of air in a column packed with 4 millimeter Beryl saddles having a non-wetting silicone resin coating. The air flow rate was 500 cc. per minute and the liquid flow rate 100 cc. per minute. The void space within the packing of Beryl saddles was approximately 250 cubic centimeters.

The column packing had been prepared by coating conventional ceramic Beryl saddles with a silicone resin, which was cured after application to the saddle for 4 hours at 110° C. Washing in distilled water removed any unreacted resin to reveal a surface obviously not wetted by water as evidenced by water droplet formation on its surface. The particular silicone resin employed was a methyl phenyl polysiloxane.

The results of the above stripping operation, in which the dispersion was given one pass through the bed, and further operations conducted in a similar manner using polystyrene as the non-wetting coating, are set forth in the following Table III.

The data of Runs 3–8 as compared to Runs 1–2 (duplicate controls) reveal a very rapid rate of removal of the benzene on the Beryl saddles coated with the specified non-wetting material, as compared to stripped rates achieved with untreated Beryl saddles.

In a manner similar to the above examples, other fugacious organic materials including chlorinated solvents such as methylene chloride, perchloroethylene and 1,1,1-trichloroethane; liquid aliphatic and aromatic hydrocarbons; higher alkanols such as ethanol, propanol, propylene glycol and ketones such as acetone and methyl ethyl ketone are efficiently stripped from aqueous dispersion in the presence of solid, non-wetting surfaces. The amount of disperse organic phase that can be efficiently removed in this manner varies over wide limits, but the invention is best applied to dilute dispersions with from .001 to about 10 percent by weight of the fugacious organic material to be separated from dispersion.

7. A method as in claim 6 wherein the solids with non-wetting surfaces are characterized by a density within the range from about 0.95 to 1.05.

8. A method as in claim 6 wherein the fugacious organic material is dissolved in the aqueous dispersion and the non-wetting surface of the solid comprises a hydrocarbon or hydrophobic silicone.

9. A method for stripping fugacious organic materials from aqueous dispersion which comprises flowing the aqueous dispersion over a fixed, porous bed of shaped solids having non-wetting surfaces and flowing an inert gas stream through the column counter-current to the aqueous dispersion.

10. A method as in claim 9 wherein the fugacious organic material is dissolved in the aqueous dispersion and

TABLE III

| Fixed Bed Packing | Run Number | Benzene Concentration (p.p.m.) | | | Removal Rate (mg./min.) |
|---|---|---|---|---|---|
| | | Initial | Final | Percent Removed | |
| Unitreated Saddles | 1A | 46 | 7.5 | 83 | 3.85 |
| | 2B | 46 | 7.8 | 84 | 3.82 |
| Silicon Resin Treated Saddles | 3 | 49 | <1.0 | 98 | 4.8+ |
| | 4 | 54 | 4 | 93 | 5.2 |
| | 5 | 72 | 14 | 80 | 5.6 |
| Polystyrene Treated Saddles | 6 | 74 | 7.5 | 90 | 7.65 |
| | 7 | 85 | 7.5 | 91 | 7.75 |
| | 8 | 89 | 4.2 | 96 | 8.48 |

What is claimed is:

1. A method for stripping fugacious organic materials from an aqueous dispersion which comprises contacting a gas stream with the aqueous dispersion in the presence of a solid material having a non-wetting surface.

2. A method as in claim 1 wherein the non-wetting solid surface is a hydrocarbon.

3. A method as in claim 1 wherein the non-wetting surface is composed of a hydrophobic silicone.

4. A method as in claim 1 wherein the gas stream is a stream of air.

5. A method as in claim 1 wherein the disperse organic phase constitutes from about 0.001 to 10 percent by weight of the dispersion.

6. A method for stripping fugacious organic materials from aqueous dispersion which comprises incorporating into the dispersion particulate solids characterized by having non-wetting surfaces and blowing the resulting aqueous slurry with a gas stream.

the non-wetting surface of the solid comprises a hydrocarbon or hydrophobic silicone.

References Cited

UNITED STATES PATENTS

| | | | |
|---|---|---|---|
| 2,847,368 | 8/1958 | Worthington et al. | 203—49 X |
| 2,758,073 | 8/1956 | Krebs et al. | 203—41 |
| 3,096,380 | 7/1963 | Bolen | 203—41 X |
| 3,409,510 | 11/1968 | Le Master et al. | 203—20 |

NORMAN YUDKOFF, Primary Examiner

J. SOFER, Assistant Examiner

U.S. Cl. X.R.

159—16, 47; 203—50, 57